United States Patent
Diab et al.

(10) Patent No.: US 9,088,422 B2
(45) Date of Patent: Jul. 21, 2015

(54) METHOD AND SYSTEM FOR ENERGY EFFICIENT BASED SERVICE OPTIMIZATION BY A BROADBAND GATEWAY

(75) Inventors: Wael Diab, San Francisco, CA (US);
Jeyhan Karaoguz, Irvine, CA (US);
Xuemin Chen, San Diego, CA (US);
David Garrett, Tustin, CA (US); David Lundgren, Mill Valley, CA (US); Rich Prodan, Niwot, CO (US)

(73) Assignee: BROADCOM CORPORATION, Irvine, CA (US)

( * ) Notice: Subject to any disclaimer, the term of this patent is extended or adjusted under 35 U.S.C. 154(b) by 611 days.

(21) Appl. No.: 12/982,355

(22) Filed: Dec. 30, 2010

(65) Prior Publication Data
US 2011/0299549 A1    Dec. 8, 2011

Related U.S. Application Data

(60) Provisional application No. 61/351,696, filed on Jun. 4, 2010.

(51) Int. Cl.
*H04L 12/28* (2006.01)
*G08C 17/00* (2006.01)
(Continued)

(52) U.S. Cl.
CPC ............ *H04L 12/12* (2013.01); *H04L 12/2834* (2013.01); *H04L 41/0833* (2013.01); *Y02B 60/34* (2013.01)

(58) Field of Classification Search
CPC ......... G06F 1/3296; G06F 1/266; G06F 1/32; Y02B 70/3225; Y02B 60/1296; Y02B 60/50
USPC .......... 370/252, 329, 235, 311; 713/300, 310, 713/320; 307/18
See application file for complete search history.

(56) References Cited

U.S. PATENT DOCUMENTS 6,762,675 B1 * 7/2004 Cafiero et al. ............. 340/10.42
7,010,589 B2 * 3/2006 Ewing et al. .................. 709/223
(Continued)

FOREIGN PATENT DOCUMENTS

| CN | 100367721 | 2/2008 | | |
|---|---|---|---|---|
| GB | 2502034 A | * | 7/2011 | ............ H04W 76/02 |
| WO | 2010039239 A2 | 4/2010 | | |

OTHER PUBLICATIONS

Tompros, et al., "Enabling applicability of energy saving applications on the appliances of the home environment", IEEE Network, IEEE Service Center, New York, vol. 23, No. 6, p. 8-16, Nov. 1, 2009.
(Continued)

*Primary Examiner* — Ayaz R. Sheikh
*Assistant Examiner* — Mounir Moutaouakil
(74) *Attorney, Agent, or Firm* — Foley & Lardner LLP; Christopher J. McKenna; Paul M. H. Pua

(57) ABSTRACT

A broadband gateway may provide energy efficient management of services delivered to a home network. The energy efficient service management may enable reducing and/or enhancing energy consumption within access networks utilized during the managed services. The energy management service may comprise determining energy-related costs associated with providing services, based on use of external physical layer connections. The services may then be provisioned based on energy-related costs associated with the services. The service provisioning may comprise controlling and/or adjusting bitrate selection, physical (PHY) layer selection, and/or service level agreement (SLA) parameters. The broadband gateway may negotiate with the network access service providers during the provisioning of the services. This may comprise negotiating and/or configuring micro-leases for use in providing the services. A dedicated energy messaging protocol may be utilized for communicating by the broadband gateway, and/or by network access service and/or content providers during the energy efficient service management.

20 Claims, 7 Drawing Sheets

(51) Int. Cl.
*G06F 1/26* (2006.01)
*H04L 12/12* (2006.01)
*H04L 12/24* (2006.01)

(56) References Cited

U.S. PATENT DOCUMENTS

| | | | |
|---|---|---|---|
| 7,689,843 B2* | 3/2010 | Hassan et al. | 713/320 |
| 7,715,951 B2* | 5/2010 | Forbes et al. | 700/291 |
| 7,764,981 B2* | 7/2010 | Kalofonos et al. | 455/574 |
| 7,881,217 B2* | 2/2011 | El-Damhougy et al. | 370/252 |
| 8,243,742 B2* | 8/2012 | Forsberg et al. | 370/401 |
| 2003/0118089 A1* | 6/2003 | Deczky | 375/222 |
| 2005/0088977 A1* | 4/2005 | Roch et al. | 370/254 |
| 2006/0239272 A1* | 10/2006 | Heidari-Bateni et al. | 370/395.21 |
| 2008/0151913 A1* | 6/2008 | El-Damhougy et al. | 370/401 |
| 2010/0082174 A1 | 4/2010 | Weaver | |
| 2011/0106327 A1* | 5/2011 | Zhou et al. | 700/291 |
| 2011/0264294 A1* | 10/2011 | Chen | 700/295 |
| 2011/0282497 A1* | 11/2011 | Josephson et al. | 700/276 |
| 2012/0249347 A1* | 10/2012 | Rival et al. | 341/100 |
| 2012/0290230 A1* | 11/2012 | Berges Gonzalez et al. | 702/61 |
| 2012/0296482 A1* | 11/2012 | Steven et al. | 700/291 |

OTHER PUBLICATIONS

Barros, et al., "AIM architecture evaluation and validation testbed", Ultra Modern Telecommunications & Workshops, International Conference on, IEEE, Piscataway, US, p. 1-5, Oct. 12, 2009.

Berl, et al., "Virtualization in energy-efficient future home environments", IEEE Communications Magazine, IEEE Service Center, Piscataway, US, vol. 47, No. 12, p. 62-67, Dec. 1, 2009.

European search report in the copending European application 11004114.2, mailed Apr. 12, 2012.

Tompros et al., "Enabling applicability of energy saving applications on the appliances of the home environment," IEEE Network, Nov./Dec. 2009.

* cited by examiner

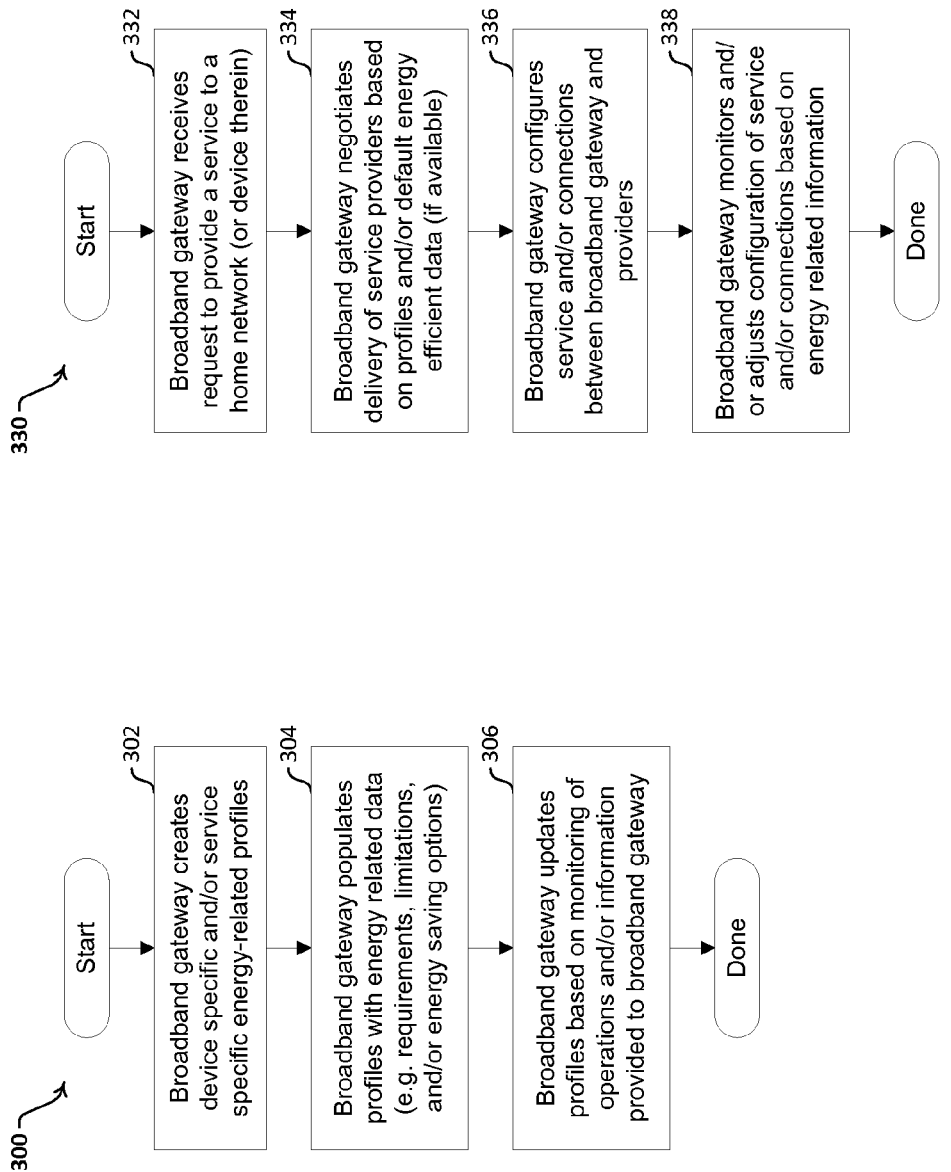

METHOD AND SYSTEM FOR ENERGY EFFICIENT BASED SERVICE OPTIMIZATION BY A BROADBAND GATEWAY

CROSS-REFERENCE TO RELATED APPLICATIONS/INCORPORATION BY REFERENCE

This patent application makes reference to, claims priority to, and claims benefit from U.S. Provisional Application Ser. No. 61/351,696 filed on Jun. 4, 2010. This application also makes reference to:

U.S. patent application Ser. No. 12/355,377 filed on Jan. 16, 2009;
U.S. patent application Ser. No. 12/355,413 filed on Jan. 16, 2009;
U.S. patent application Ser. No. 12/355,480 filed on Jan. 16, 2009;
U.S. patent application Ser. No. 12/395,383 filed on Jan. 16, 2009;
U.S. patent application Ser. No. 12/982,321 filed on Dec. 30, 2010;
U.S. patent application Ser. No. 12/982,355 filed on Dec. 30, 2010;
U.S. patent application Ser. No. 12/981,971 filed on Dec. 30, 2010;
U.S. patent application Ser. No. 12/981,993 filed on Dec. 30, 2010;
U.S. patent application Ser. No. 12/982,216 filed on Dec. 30, 2010;
U.S. patent application Ser. No. 12/984,433 filed on Dec. 30, 2010;
U.S. patent application Ser. No. 12/982,205 filed on Dec. 30, 2010;
U.S. patent application Ser. No. 12/982,353 filed on Dec. 30, 2010;
U.S. patent application Ser. No. 12/981,966 filed on Dec. 30, 2010;
U.S. patent application Ser. No. 12/982,453 filed on Dec. 30, 2010;
U.S. patent application Ser. No. 12/982,172 filed on Dec. 30, 2010;
U.S. patent application Ser. No. 12/982,429 filed on Dec. 30, 2010;
U.S. patent application Ser. No. 12/981,990 filed on Dec. 30, 2010;
U.S. patent application Ser. No. 12/982,442 filed on Dec. 30, 2010;
U.S. patent application Ser. No. 12/982,000 filed on Dec. 30, 2010;
U.S. patent application Ser. No. 12/982,010 filed on Dec. 30, 2010;
U.S. patent application Ser. No. 12/982,022 filed on Dec. 30, 2010;
U.S. patent application Ser. No. 12/981,986 filed on Dec. 30, 2010;
U.S. patent application Ser. No. 12/982,236 filed on Dec. 30, 2010;
U.S. patent application Ser. No. 12/982,091 filed on Dec. 30, 2010
U.S. patent application Ser. No. 12/982,213 filed on Dec. 30, 2010;
U.S. patent application Ser. No. 12/982,166 filed on Dec. 30, 2010;
U.S. patent application Ser. No. 12/982,340 filed on Dec. 30, 2010;
U.S. patent application Ser. No. 12/982,073 filed on Dec. 30, 2010;
U.S. patent application Ser. No. 12/982,501 filed on Dec. 30, 2010;
U.S. patent application Ser. No. 12/982,206 filed on Dec. 30, 2010;
U.S. patent application Ser. No. 12/982,440 filed on Dec. 30, 2010;
U.S. patent application Ser. No. 12/982,171 filed on Dec. 30, 2010;
U.S. patent application Ser. No. 12/982,223 filed on Dec. 30, 2010;
U.S. patent application Ser. No. 12/982,305 filed on Dec. 30, 2010;
U.S. patent application Ser. No. 12/982,477 filed on Dec. 30, 2010;
U.S. patent application Ser. No. 12/982,331 filed on Dec. 30, 2010;
U.S. patent application Ser. No. 12/982,036 filed on Dec. 30, 2010;
U.S. patent application Ser. No. 12/982,196 filed on Dec. 30, 2010;
U.S. patent application Ser. No. 12/982,391 filed on Dec. 30, 2010;
U.S. patent application Ser. No. 12/982,405 filed on Dec. 30, 2010;
U.S. patent application Ser. No. 12/981,753 filed on Dec. 30, 2010;
U.S. patent application Ser. No. 12/982,414 filed on Dec. 30, 2010; and
U.S. patent application Ser. No. 12/981,733 filed on Dec. 30, 2010.

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to audio processing. More specifically, certain embodiments of the invention relate to a method and system for energy efficient based service optimization by a broadband gateway.

BACKGROUND OF THE INVENTION

With the continuous growth of digital television or broadcast multimedia, and/or broadband access, which may be used in conjunction with online businesses, social networks, and/or other online services and applications, users may desire having access to a larger number of providers and/or a broader range of content in a manner that is flexible and/or suits the users' lifestyles. Most users connect to the Internet using web browsers running on personal computers (PCs) and/or mobile devices such as Smartphones. Furthermore, most households may have one or more televisions that may be used to view television broadcasts and/or multimedia content. Television broadcasts may include terrestrial TV, Cable-Television (CATV), satellite TV and/or Internet Protocol television (IPTV) based broadcasts. To protect against unauthorized reception and/or use of multimedia content, service providers may require use of dedicated set-top boxes (STBs) that may be used to encrypt broadcast signals communicated from the service providers to generate suitable video and/or audio streams that may be played via televisions and/or other display/playback devices in the household.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for energy efficient based service optimization by a broadband gateway, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 3A is a flow chart that illustrates exemplary steps for utilizing a broadband gateway to generate and/or update device or service profiles for use in conjunction with energy efficient based service management, in accordance with an embodiment of the invention.

FIG. 3B is a flow chart that illustrates exemplary steps for utilizing a broadband gateway to provide energy efficient based management of service delivery to a home network, in accordance with an embodiment of the invention.

DETAILED DESCRIPTION OF THE INVENTION

Figure 1A:
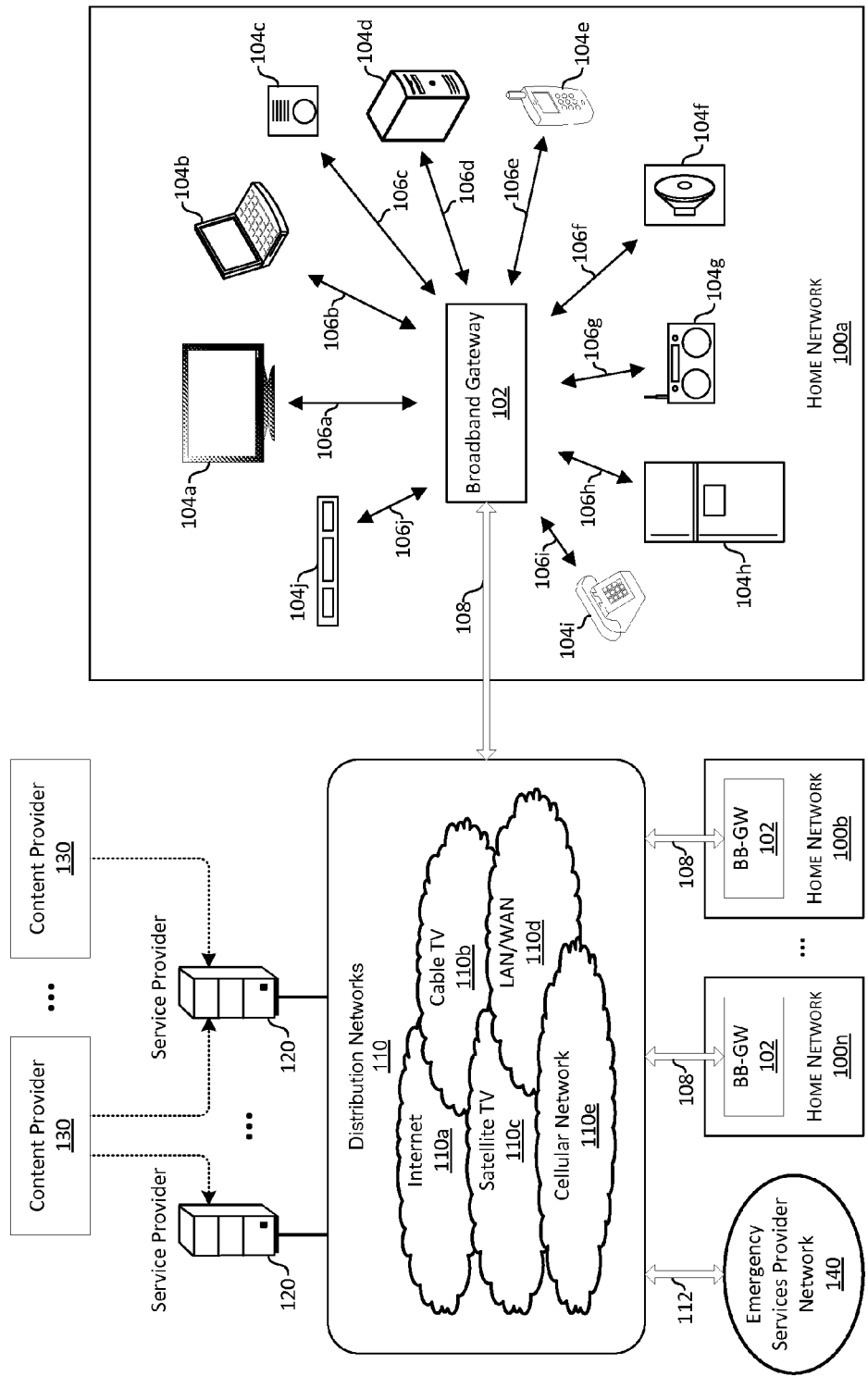
FIG. 1A is a block diagram illustrating an exemplary communication system that comprises a home network serviced by a broadband gateway, in accordance with an embodiment of the invention.

Certain embodiments of the invention may be found in a method and system for energy efficient based service optimization by a broadband gateway. In various embodiments of the invention, a broadband gateway, which may be communicatively coupled to a plurality of devices in a home network, and/or which may be operable to handle one or more physical layer connections to corresponding one or more network access service providers, may be utilized to provide energy efficient management of services provided and/or delivered to the home network. The energy efficient service management may comprise determining energy-related costs associated with providing a service to one or more of the plurality of devices, wherein the energy-related costs may be based on use of at least one of the plurality of physical layer connections in conjunction with providing services. In this regard, service provisioning may enable reduction and/or optimization of power consumption within access networks based on the service provisioning. The service may be provisioned based on the determined energy-related costs associated with that service. The service may comprise obtaining and/or delivering content for consumption by the one or more of the plurality of devices in the network. The broadband gateway may negotiate with network access service providers during the configuration of the services. The negotiations may comprise requesting credits for performing the service provisioning. In this regard, the credit may comprise energy-saving credits provided for enable reduction and/or optimization of power consumption within access networks. The service configuration may comprise controlling and/or adjusting bitrate selection, physical (PHY) layer selection, and/or service level agreement (SLA) parameters.

The broadband gateway may determine and/or acquire energy-related information for use in providing the energy efficient service management. The energy-related information may correspond to the managed services, and/or to home devices that may be utilized in conjunction with the managed services. The energy-related information may comprise energy requirements, energy limitations, device use pattern, time of use related data, and/or energy-saving options. The broadband gateway may track actual energy use by each of the one or more serviced devices, and the broadband gateway may update and/or modify the stored energy-related information based on that tracking. The stored energy-related information may comprise service and/or device profiles corresponding to each of the managed services and/or devices associated with the managed services. The profiles may be configurable, wherein the profile configuration may comprise initializing and/or modifying energy-related information corresponding to associated services or devices. The broadband gateway may display activity associated with the energy management service via a user interface. This may comprise displaying energy related activities and/or data associated with each of the managed services or devices. A dedicated energy-related messaging protocol may be used for exchanging energy-related messages and/or data within the home network, and/or with the network access service providers.

FIG. 1A is a block diagram illustrating an exemplary communication system that comprises a home network serviced by a broadband gateway, in accordance with an embodiment of the invention. Referring to FIG. 1A, there is shown a home network 100a, a plurality of distribution networks 110, a plurality of service providers 120, and a plurality of content providers 130. The home network 100a may be serviced by a broadband gateway 102. Also shown in FIG. 1A are additional home networks 100b, . . . , 100n, and an emergency services provider network 140. Each of the home networks 100b, . . . , 100n may also be serviced by a broadband gateway 102.

The service providers 120 may comprise various entities which may provide various services to broadband gateways 102 and/or to devices serviced by the broadband gateways 102, such as the plurality of home devices 104a-104j. Some of the service providers 120 may comprise network access service providers which provide physical layer connections to the broadband gateway 102. Such physical layer connections may then be utilized to access content provided by the content providers 130, access services provided by other ones of the service providers 120, and/or access an intranet or the Internet at-large. In this regard, "network access service provider" as utilized herein, is distinguished from the more generic term "service provider" which may encompass services other than providing physical layer access to a network. Cable television providers, plain old telephone service (POTS) providers, digital subscriber line (DSL) providers, cellular providers, WiMAX providers, and satellite providers are examples of network access service providers. In an exemplary embodiment of the invention, the broadband gateway 102 may enable connecting to multiple service providers 120 to facilitate receiving content originating from one or more of the content providers 130.

The content providers 130 may comprise various entities and/or networks which may generate, capture, and/or package content that may be distributed to end-users (i.e. "subscribers"), via the service providers 120 and/or the distribution networks 110. In this regard, content may comprise audio, video, multimedia, e-book, gaming, and/or other content. Exemplary content providers may comprise commercial providers of multimedia content, such as major film or television production and/or distribution companies (e.g. Paramount Pictures or Warner Bros.), and/or providers of personal content (e.g. user-generated content). The content may be, for example, downloadable and/or streaming, rented and/or purchased. Content originating from the content providers 130 may be distributed to the end-users (e.g. consumers) by the service providers 120. In some instances, content providers 120 and service providers 120 may be separate entities. In some instances, however, a single provider may provide both content and services. That is, an entity that functions as a network access service provider may also provide content and/or services other than network access and, thus, that entity may also be accurately referred to as a "content provider" and/or a "service provider." The content and/or services that are provided by the content provider and/or the service provider may be provided to the broadband gateways 102 via one or more physical connections provided by a network access service provider.

The plurality of distribution networks 110 may comprise one or more networks that may be operable to enable wireless and/or wired communication among a plurality of local and/or remote entities, based on one or more networking and/or communication infrastructures. In this regard, the plurality of distribution network 110 may be utilized to enable distributing multimedia content generated by the content providers 130, directly and/or via the service providers 120, to end-users. The network connectivity available via the plurality of distribution networks 110 may be based on one or more communication standards and/or protocols. The plurality of distribution networks 110 may comprise, for example, Internet 110a, the Cable Television (CATV) network 110b, Satellite Television (TV) network 110c, wireless local network area/wide network area (LAN/WAN) 110d, and/or cellular network 110e.

The Internet 110a may comprise a system of interconnected networks to enable exchange of data among a plurality of nodes, based on one or more networking standards, including, for example, the Internet Protocol (IP). The Internet 110a may enable connectivity among a plurality of private and public, academic, business, and/or government nodes and/or networks. The physical connectivity in the Internet 110a may be provided via, for example, the Public Switched Telephone Network (PSTN), copper wires, fiber-optic cables, wireless interfaces, and/or other protocols and/or standards-based interfaces. The transport functionality in the Internet 110a may be performed based on, for example, one or more transport protocols, such as the Transmission Control Protocol/IP (TCP/IP), for example. The CATV network 110b may comprise suitable distribution nodes, systems, and/or subnetworks that may enable forwarding of communication between CATV providers and a plurality of cable-TV consumers. For example, the CATV network 110b may comprise a network of fiber optics and/or coaxial cables for use in CATV broadcasts. The satellite TV network 110c may comprise suitable distribution nodes, systems, and/or subnetworks that may enable communication of satellite TV broadcast by satellite TV providers to a plurality of consumers. For example, the satellite network 110c may comprise a plurality of orbiting satellite nodes and/or one or more terrestrial centers in a satellite-TV system.

The LAN/WAN network 110d may comprise suitable logic, circuitry, interfaces, and/or code that may be operable to enable implementation of one or more wired and/or wireless LAN or WAN standards and/or protocols. Exemplary WAN technologies comprise, for example, WiMAX-based networks. Exemplary LAN technologies may comprise, for example, those based on IEEE 802.11 standards, including, for example, WiFi-based networks. The cellular network 110e may comprise suitable logic, circuitry, interfaces and/or code that may be operable to enable communication via one or more cellular technologies. Exemplary cellular technologies may comprise Code Division Multiple Access (CDMA), wideband CDMA (WCDMA), CDMA1000, High-Speed Downlink Packet Access (HSDPA), Global System for Mobile Communications (GSM), General Packet Radio Services (GPRS), Enhanced Data Rates for Global Evolution (EDGE), and/or Universal Mobile Telecommunication System (UMTS). The cellular network 110e may comprise, for example, a plurality of control and/or switching nodes, and a plurality of base stations that enable transmission and/or reception of cellular based communications between the cellular network 110e and cellular capable devices.

Each of the home networks 100a-100n may correspond to a location that may comprise a plurality of devices, such as a plurality of home devices 104a-104j in the home network 100a, which may be serviced and/or managed by an instance of the broadband gateway 102. In this regard, the location may be a residence (e.g., home, apartment), a small business, a school, a library, and/or other like settings in which users may want to obtain access to service and/or to content provider networks. The broadband gateway 102 may be utilized in a home network, such as the home network 100a, to provide connectivity between the home network and one or more of the service providers 120 (and/or one or more of the content providers 130) via the distribution networks 110.

The broadband gateway 102 may comprise suitable logic, circuitry, interfaces, and/or code that may be operable to implement various aspects of the invention. In this regard, the broadband gateway 102 may be operable to communicate with the content providers 130, the service providers 120, and the plurality of home devices 104a-104j. In this manner, the broadband gateway 102 may enable bidirectional communication of content and/or other information between the content providers 130, the service providers 120 and the devices 104a-104j. Communications between the broadband gateway 102 and the content providers 130 and/or service providers 120 may be carried over optical, wired, and/or wireless links of the distribution network(s) 110. Similarly, Communications between the broadband gateway 102 and the devices 104a-104j may be carried over optical, wired, and/or wireless links. In an exemplary aspect of the invention, a single broadband gateway 102 may be operable to handle multiple physical layer (i.e., layer 1 of the open-systems interconnection model (OSI)) connections 108 to multiple ones, or portions, of the distribution network(s) 110, where different ones or portions of the distribution network(s) 110 may be owned, operated, leased, or otherwise associated with different ones of the network access service providers 120. For example, a first network access service provider may provide network access to the broadband gateway 102 via a DSL connection over twisted-pair cabling, and a second network access service provider may provide network access to the broadband gateway 102 via a cable television connection over coaxial cabling. In some instances, the broadband gateway 102 may be operable to concurrently communicate over the multiple physical layer connections provided by the multiple network access service providers.

The broadband gateway 102 may operate as an interface device that may allow one or more service and/or content providers to interact with various devices in the home network. In this regard, the broadband gateway 102 may be operable to perform and/or provide various services that may pertain to enabling and/or facilitating reception of content from one or more content providers 130, wherein the content may be delivered through one or more services providers 120. For example, the broadband gateway 102 may be operable to perform such operations as network access related processing (e.g. PHY/MAC, and/or transport layer processing), encryption and/or decryption, user and/or account authentication, and/or at least some of video and/or audio processing operations which may be necessary for consumption of multimedia content.

The broadband gateway 102 may communicate with various devices in the home networks using optical, wired and/or wireless communication links. Devices serviced by, and/or connected with the broadband gateway 102 may comprise content consuming devices and/or other, non-content consuming household or home devices that may be operable to interact with the broadband gateway 102. For example, the broadband gateway 102 may service, and/or may communicate with the plurality of home devices 104a-104j in the home network 100a. The home devices may comprise, for example, one or more of a television 104a, a laptop computer 104b, a smoke detector, a carbon monoxide detector, and/or a security alarm 104c, a computer and/or server 104d, a mobile phone 104e, a speaker 104f, an AM/FM radio 104g, an appliance 104h (e.g., refrigerator), a phone 104i, and a digital video recorder (DVR) or personal video recorder (PVR) 104j. The broadband gateway 102 may interact with each of the home devices 104a-104j via corresponding links 106a-106j, which may be supported by the broadband gateway 102 and the corresponding home device. For example, the link 106a between the broadband gateway 102 and the television 104a may comprise a High-Definition Multimedia Interface (HDMI) cable. The link 106b may comprise, for example, a wired Ethernet link, a wireless Ethernet link, a Universal Serial Bus (USB) link, or an IEEE 1394 link. The link 106c may comprise, for example, a two-wire link or a wireless link. The link 106d may comprise, for example, a wired Ethernet link, a wireless Ethernet link, a USB link, or an IEEE 1394 link. The link 106e may comprise, for example, a wireless Ethernet link, a USB link, or a cellular link. The link 106f may comprise speaker wire and/or a wireless link. The link 106g may comprise, for example, AM and/or FM radio transmissions broadcast received using the broadband gateway 102. The link 106h may comprise, for example, a wired or wireless link. The link 106i may comprise, for example, a phone line. The link 106j may comprise, for example, a wired or a wireless link.

The broadband gateway 102 may also be operable to provide and/or support various other, non-content related services in the home network 100a. For example, the broadband gateway 102 may provide emergency-related services in the home network 100a. For example, the emergency services provider network 140 may be connected to the distribution networks 110 via a link 112. The emergency services provider network 140 may be associated with one or more emergency service provider entities. For example, a public entity such as a 911 center and/or a private entity such as a security company may be able to interact with the broadband gateway 102 in the home network 100a via the distribution networks 110.

The broadband gateway 102 may also be operable to provide various energy related services. The energy related services provided by the broadband gateway 102 may enable optimization and/or reduction of energy use or consumption, and/or may also enable receiving compensation and/or claiming, capturing, and/or redeeming energy saving credits/rewards for enabling and/or facilitating any such energy consumption optimization and/or reduction. The broadband gateway 102 may be operable to provide, for example, energy efficient management of services delivered to a home network, such as to the home network 100a, by service and/or content providers, such as one or more of the service providers 120 and/or the content provider 130. Energy efficient management of services delivered through the broadband gateway 102 may enable optimizing and/or reducing energy use or consumption on the network-side, wherein that energy use or consumption may result from and/or correspond to operations performed on the network-side to facilitate delivery of the services to the home network 100a via the broadband gateway 102. In this regard, "network-side" operations may comprise operations performed external to the home network 100a. This may comprise, for example, operations performed by the service providers 120 and/or the content providers 130, and/or operations performed to provide and/or support connectivity and/or interactions between the broadband gateway 102 and the service providers 120, via the distribution networks 110 for example. In this regard, establishing connections to the broadband gateway 102, within the distribution networks 110 for example, and/or utilizing these connections, such as to communicate content via these connections, may require energy use. The energy consumption reduction and/or optimization may result from, for example, selecting energy efficient connections, and/or utilizing connections in a manner that enable reducing energy consumption by ensuring, for example, that the connections are only setup and utilized when content is requested. Accordingly, the energy efficient service management may comprise configuring and/or managing network-side connectivity and/or interactions between the broadband gateway 102 and the service providers 120, based on energy related information corresponding to home networks, and/or devices therein, serviced by broadband gateway.

While the broadband gateway 102 is shown in FIG. 1A as a single and separate device, the invention need not be so limited. In one embodiment of the invention, the broadband gateway functionality may be implemented in a distributed manner over two or more devices. Furthermore, the broadband gateway may be implemented as a virtual platform, for example in instances where it may be implemented in distributed manner. In another embodiment of the invention, some or all of the functionality of the broadband gateway may be implemented within one of the televisions available in the home.

As illustrated in FIG. 1A, a plurality of home networks 100b, ..., 100n, may also be connected to the distribution networks 110. These home networks 100b, ..., 100n may operate in substantially the same manner as the home network 100a. By having multiple home networks connected to the distribution networks 110, various applications, such as peer-to-peer communication and/or data aggregation operations may be possible by utilizing the broadband gateways 102 in the home networks.

In operation, the broadband gateway 102 may be utilized as an interface device that may allow one or more service providers 120, content providers 130, and/or emergency service provider networks 140 to interact with various devices in a home network, such as in the home network 100a. In this regard, the broadband gateway 102 may support configuring and/or using the plurality of broadband connections 108. The broadband connections 108 may comprise optical, wired and/or wireless connections between the broadband gateway 102 and the distribution networks 110, to enable communication between the broadband gateway 102 and the service providers 120, content providers 130, and/or emergency service provider networks 140 for example. The broadband gateway 102 may be operable to perform and/or provide various services that may pertain to enabling and/or facilitating reception of data, such as multimedia content, for example, from one or more content providers, wherein the content may be delivered through one or more services providers. The broadband gateway 102 may distribute the received content to one or more devices in a home network, for consumption, and/or may perform, directly and/or indirectly using other devices, any processing and/or operations (e.g., decryption and/or account validation) that may be needed to ensure that the content may be consumed by the target home device(s).

The broadband gateway 102 may also provide and/or support various other services in the home network 100a beyond reception and/or download of content. For example, the broadband gateway 102 may be operable to provide energy management in the home network 100a, by controlling and/or adjusting configuration of one or more devices in the home network to reduce power consumption for example. The broadband gateway 102 may also provide emergency-related services in the home network 100a, including allowing first responders to provide alerts to a select group of users by accessing the broadband gateway 102 via secure links provided by the service/content providers.

The broadband gateway 102 may also provide and/or support various other services in the home network 100a beyond, and/or in conjunction with supporting or facilitating reception, download, and/or consumption of content. For example, the broadband gateway 102 may provide energy related services in the home network 100a. In this regard, the broadband gateway 102 may provide energy efficient management of services delivered to the home network 100a, to enable optimizing and/or reducing energy use or consumption on the network-side, and/or to also enable claiming, capturing, and/or redeeming energy saving credits/rewards for enabling and/or facilitating any such energy consumption optimization and/or reduction. The energy efficient service management provided by the broadband gateway 102 may comprise configuring and/or managing network-side connectivity and/or interactions between the broadband gateway 102 and the service providers 120, based on energy related information corresponding to home networks, and/or devices therein, which may be serviced by broadband gateway.

In this regard, the broadband gateway 102 may provide energy efficient management of service delivery to the home network 100a, to enable optimizing and/or reducing energy use or consumption on the network-side, and/or to enable claiming, capturing, and/or redeeming energy-saving credits/rewards in exchange for enabling such energy consumption optimization and/or reduction. The broadband gateway 102 may interact and/or negotiate with service (or content) providers during energy efficient service management, to facilitate energy consumption reduction and/or optimization during service delivery, and/or obtaining energy-saving credits based thereon. The energy efficient service management may comprise configuring and/or managing network-side connectivity and/or interactions between the broadband gateway 102 and the service providers 120, via the distribution networks 110 for example. This may enable reducing energy use and/or consumption resulting from and/or corresponding to operations performed on the network-side to facilitate providing and/or delivering services, such as content delivery, to the home network 100a via the broadband gateway 102. For example, during energy efficient service management, the broadband gateway 102 may optimize energy consumption on the network-side by adaptively and/or dynamically performing one or more of bitrate selection, physical (PHY) layer selection, and/or service contract configuration. In this regard, service contract configuration may comprise adjusting and/or modifying service performance parameters, such as latency and/or quality of service, for example.

The energy efficient service management provided by the broadband gateway 102 may be performed based on energy related information corresponding to managed services. In this regard, the broadband gateway 102 may determine and/or utilize energy costs with various configurable aspects of the service delivery, such as available bitrates, PHY layers, and/or service performance parameters. The broadband gateway 102 may also utilize information pertaining to serviced devices within the home network 102 to further enhance and/or optimize energy consumption on the network-side. In this regard, the broadband gateway 102 may utilize energy related information pertaining to devices that may be used in conjunction with, and/or based on the managed services, to enable reducing and/or optimizing energy consumption on the network-side, and/or to obtain credits on behalf of users of the broadband gateway and/or users of the serviced device for facilitating any such energy consumption and/or reduction. The energy related information may comprise, for example, energy requirements and/or limitations, and/or energy saving options in the serviced devices. The devices specific energy data may be utilized, for example, during negotiations with service providers 120. For example, based on determination of the capabilities of the television 104a, the broadband gateway 102 may request content with lesser video mode (e.g. 720p instead of 1080p), which would translate into less communicated data via the distribution networks 110 thus potentially allowing for reduction in energy consumption during the data communication.

In one exemplary embodiment of the invention, certain content may be requested from the broadband gateway 102 by a device and/or a user in the home network 100a. Accordingly, the broadband gateway 102 may determine whether the content may be obtained and/or delivered in various ways, and may determine energy-related costs associated with each of the available means for obtaining and/or delivering the requested content. The broadband gateway 102 may negotiate with service and/or content providers to offer to obtain the requested content in manner that may enable reducing and/or optimizing energy consumption during delivery of the content, through the distribution networks 110, for example. In this regard, the broadband gateway 102 may request, for example, energy-saving credits in exchange for agreeing to receive the requested content in energy efficient manner. The energy-saving credits may be utilized to, for example, discount payments assessed against users of the broadband gateway 102 and/or may be redeemed for future purchases of other content.

The energy consumption reduction and/or optimization may result directly from energy saving resulting from the (re)configuration of the broadband gateway external/network connectivity (i.e., "last-mile" or "last kilometer" connectivity). The network-side energy consumption reduction and/or optimization may also result indirectly, such as from reduction in processing and/or storage requirement through out the delivery path all the way from the source down to the broadband gateway 102, and/or from freeing resources that may otherwise be reserved to ensure the delivery parameters and/or criteria associated with higher bitrates and/or higher quality-of-service (QoS) classes.

Figure 1B:
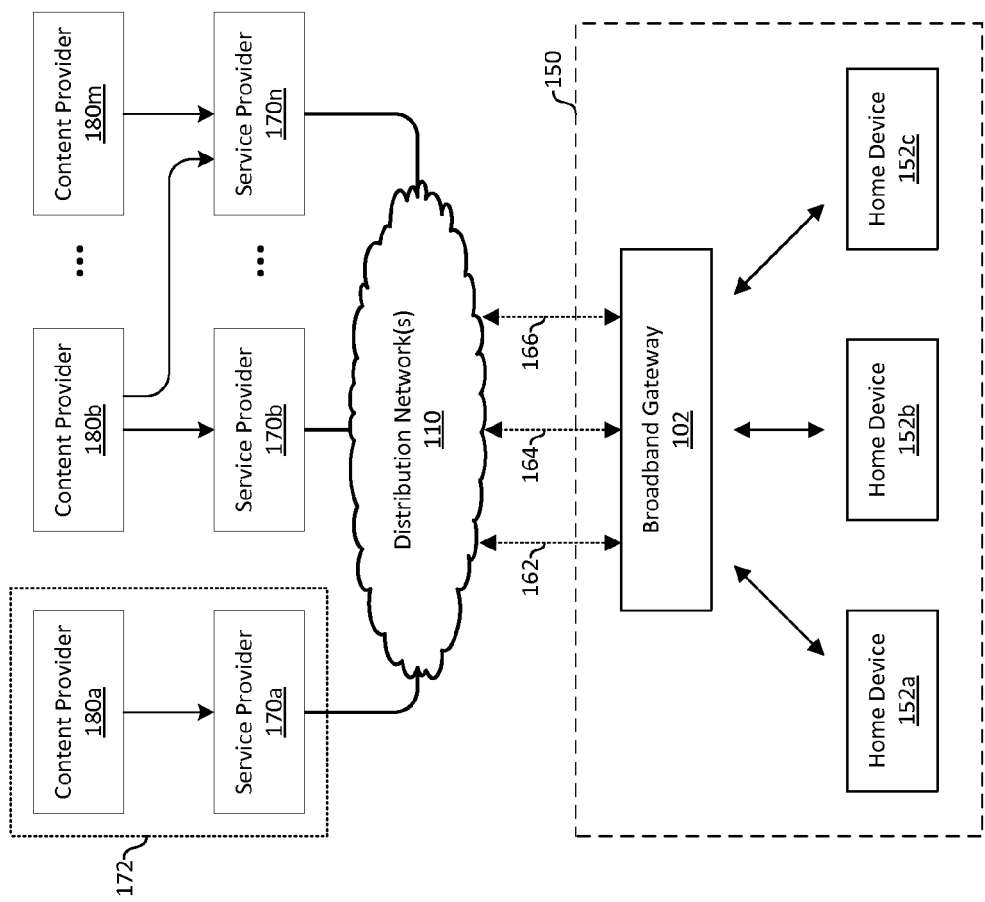
FIG. 1B is a block diagram illustrating an exemplary communication system that comprises a broadband gateway providing energy efficient based services delivery to a home network, in accordance with an embodiment of the invention.

FIG. 1B is a block diagram illustrating an exemplary communication system that comprises a broadband gateway providing energy efficient based services delivery to a home network, in accordance with an embodiment of the invention. Referring to FIG. 1B, there is shown the distribution networks 110. In this regard, the distribution networks 110 may provide access network related services, which may enable communication with, and/or delivery of data (e.g., content) to the broadband gateway 102 for example. The broadband gateway 102 shown therein may service a home network 150, which may be similar to the home networks 100a-100n of FIG. 1. Also shown in FIG. 1B are home devices 152a, 152b, and 152c; connections 162, 164, and 164; service providers 170a-170n; and content providers 180a-180m.

The devices 152a, 152b, and 152c may comprise electronic devices that may be serviced by the broadband gateway 102 in the home network 100a. Each of the devices 152a, 152b, and 152c may correspond to one or more of the plurality of devices 104a-104j, substantially as described with regard to FIG. 1A. In this regard, each of the devices 152a, 152b, and 152c may be operable to consume content, such as multimedia content, or may be inoperable to consume content. For example, the device 152a may be a digital television that may be utilized for playing received multimedia streams, whereas the device 152c may comprise an appliance, such as a refrigerator. The service providers 170a-170n may be similar to the service providers 120, substantially as described with regard to FIG. 1A. The content providers 180a-180m may be similar to the content providers 130, substantially as described with regard to FIG. 1A. The relationship between content providers and servicer providers need not be limited to one-to-one association. In this regard, a service provider, such as the service provider 170n, may be operable to provide and/or deliver content from multiple content providers, such as the content providers 180b and 180m. Similarly, a content provider, such as the content provider 180b, may be operable to provide the content via multiple service providers, such as the service providers 170b and 170n. Accordingly, multiple service options for obtaining the same content and/or multiple content sources for some desired content may be available. In some instances, as demonstrated by dashed line 172, content and service providers, such as the content provider 180a and the service provider 170a, may be merged as singular entities that may provide both content and network access servicing that may be utilized for delivering offered content.

The connections 162, 164, and 166 may comprise various connections available between the broadband gateway 102 and the service providers 170a-170n, such as via the distribution networks 110 for example. In this regard, the connections 162, 164, and 166 may be similar to the plurality of broadband connections 108, substantially as described with regard to FIG. 1A. For example, each of the connections 162, 164, and 166 may comprise a different type of wireless or wired connection, with corresponding different physical (PHY) layer that may be supported by the broadband gateway 102.

In operation, the broadband gateway 102 may provide energy efficient management of service delivery to the home network 150, substantially as described with regard to FIG. 1A, which may enable optimizing and/or reducing energy consumption on network-side, and/or to enable claiming, capturing, and/or redeeming energy-saving credits for enabling and/or facilitating any such energy consumption optimization and/or reduction. The energy efficient service management provided by the broadband gateway 102 to the home network 150 may comprise configuring and/or managing network-side connectivity and/or interactions between the broadband gateway 102 and the service providers 170a-170n. The services subjected to energy efficient management by the broadband gateway 102 may comprise obtaining and/or delivering content originating from one or more of the content providers 180a-180m. During energy efficient service management, the broadband gateway 102 may optimize energy consumption on the network-side by adaptively and/or dynamically performing one or more of bitrate selection, physical (PHY) layer selection, and/or service performance configuration.

With regard to service performance configuration, the energy efficient service management may comprise adaptively and/or dynamically setting up, configuring, controlling and/or modifying service level agreements (SLAs) pertaining to managed services. In this regard, the energy efficient management may comprise setting and/or modifying various service performance and/or delivery related parameters, such as latency and/or quality. For example, a SLA may guarantee a user in the home network 150 a fixed 100 mbps link all the time. Some services, however, may not require the maximum guaranteed bitrate, and/or may not require real-time delivery. Accordingly, the energy efficient management may comprise negotiating with services providers 170a-170n to offer accepting lower bitrates and/or less guaranteed or timely delivery, which may enable reduced energy consumption in the distribution networks 110 due to use of smaller rates and/or for performing the necessary operations at times of lower network loads. The broadband gateway 102 may seek, in exchange, energy-saving credits.

In one exemplary embodiment of the invention, micro-leases may be utilized in lieu of, and/or in conjunction with SLAs to enable controlling and/or modifying service performance parameters based on actual needs and/or requirements. In this regard, a SLA may comprise a fixed, non-adjustable service contract with long duration, such as one or more years, whereas a micro-lease may comprise a dynamically established service contract, for much shorter durations, such as on hourly, daily, or weekly basis, with negotiable performance requirements, such as latency and/or quality of service, which are only applicable to these shorter durations. Accordingly, instead of being bound by a long standing SLA, which is configured in a fixed manner based on, and/or guaranteeing maximum possible performance requirements, subscribers may configure and/or utilize micro-leases only when services are actually needed, for only the actually required duration, and/or only based on actually needed performance requirements. Accordingly, the broadband gateway 102 may configure different micro-leases for the managed services based on determined actual needs and/or limitations. In this regard, the broadband gateway 102 may establish the micro-leases based on negotiating with the service providers. The negotiations may apply to such parameters as transmission bitrates, time of delivery, and/or quality of service, and/or apportionment and/or characteristics of content in instances where the request may comprise obtaining content. For example, a user in the home network 150 may have a SLA for obtaining content from content provider 180a, via service provider 170a under some guaranteed conditions and/or criteria. In this regard, service provider 180a may correspond to user's cable service provider for example and the SLA may be associated with the user's cable service. In instances where certain content is requested, the broadband gateway 102 may determine that the requested content may also be obtained from other content providers, such as the content provider 180b. Furthermore, the broadband gateway 102 may also determined that one or more micro-leases may be utilized in conjunction with obtaining the requested content from the content provider 180b. In this regard, the micro-leases may represent one-time, short time contracts for delivery of requested content via service providers 170b and 170n, respectively. Accordingly, the broadband gateway 102 may evaluate the energy consumption requirements associated with obtaining the requested content via the existing SLA and all available micro-leases, and may select the most energy efficient option to obtain that content.

The energy efficient management may also comprising utilizing physical (PHY) layer selection. In this regard, the broadband gateway 102 may adaptively and/or dynamically select one or more PHY layers that may be utilized in conjunction with performing the requested service, such as in communicating requested content to the broadband gateway via the distribution networks 110 for example. In this regard, selection of PHY layers may have energy implications since each PHY layer may require different amount of energy for transmitting the same amount of data. For example, wired based PHY layers generally require less power than wireless based PHY layers. Also, within each category, such as within wired or wireless category, different types of connections may require different energy consumption. For example, within wired based connections, fibre based PHY layer typically require less power than copper based PHY layers. Similarly, cellular based PHY layers generally require less power than WiFi based PHY layers.

In an exemplary embodiment of the invention, the broadband gateway 102 may determine energy costs for utilizing each of the connections 162, 164, and/or 166, which may be determined based on corresponding PHY layers utilized for these connections. The broadband gateway 102 may then utilize the connection with the least energy cost. The broadband gateway 102 may negotiate with the service providers 170a-170n offering use of connection with less energy cost, such as connection 164 for example, in exchange for energy-saving credits. In one exemplary embodiment, the broadband gateway 102 may also assess use of multiplexing in determining energy use profile that may enable optimal energy consumption reduction. For example, rather than selecting only one of connections 162, 164, and 166, the broadband gateway 102 may determine an optimal PHY layer selection which may comprise utilizing connection 162 for 20% of data communication, connection 164 for 30% of data connection, and connection 166 for 50% of data communication.

The energy efficient management may also be performed based on knowledge of energy related information pertaining to home devices that may be utilized in conjunction with the requested device. For example, the home device 152a may support high definition (HD) whereas the home device 152b may only support standard definition (SD). Therefore, the broadband gateway 102 may offer receiving content with SD based resolution when the requested content is destined for the home device 152b rather than the home device 152a. Accordingly, the broadband gateway may maintain energy related data pertaining to supported services and/or devices, which may be utilized in conjunction with providing the network-side energy efficient service management performed by the broadband gateway 102. The service and/or device energy related information may be preconfigured, predetermined, and/or may comprise default parameters that may be utilized until more accurate data may be determined, based on tracking and/or monitoring, and/or from requesting and obtaining the information for the pertinent devices or services.

Figure 1C:
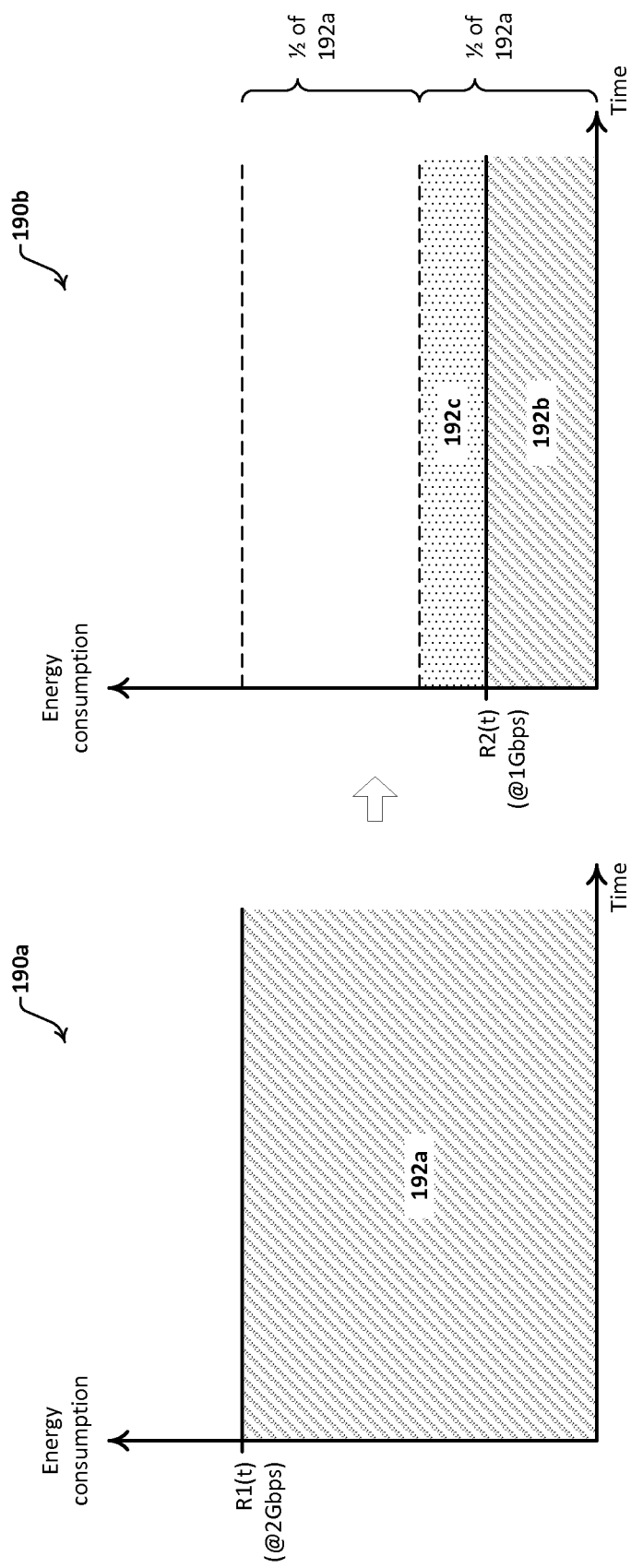
FIG. 1C is a diagram illustrating energy consumption saving that may result from utilizing links with lower bitrates during delivery of content to a home network, in accordance with an embodiment of the invention.

FIG. 1C is a diagram illustrating energy consumption saving that may result from utilizing links with lower bitrates during delivery of content to a home network, in accordance with an embodiment of the invention. Referring to FIG. 1C, there is shown 2-dimensional plans 190a and 190b, each comprising two axis. In this regard, the vertical axis (y-axis) may correspond to energy consumption associated with link as function of the link's data rate, and the horizontal axis (x-axis) may correspond to time. Accordingly, the area below curves shown therein may represent energy consumption.

The plans 190a and 190b may demonstrate energy consumption optimization and/or reduction that may result from reconfiguring links utilized in delivering data, such as content, to networks managed or serviced by broadband gateways, such as the broadband gateway 102. In this regard, the energy consumption reduction and/or optimization may result from reconfiguring links to operate at lower data rates. For example, when providing services to a home device, such as the home device 152a, the broadband gateway 102 may determine service delivery requirement and/or limitations. In this regard, the service may comprise delivery of content, from one or more of the content providers 180a-180m, via one or more of the service providers 170a-170n. Accordingly, the broadband gateway 102 may reconfigure the connection 164, which may be utilized in delivering the content, to achieve energy consumption optimization and/or reduction, by reducing the data rate used therein.

For example, the plane 190a may demonstrate energy consumption associated with configuring the connection 164 to operate at a first data rate $R_1(x)$, such as at 2 Gbps for example. In this regard, energy consumption associated with data delivery via the connection 164 may be represented by, for example, the hashed area 192a. The plane 190b may demonstrate energy consumption associated with configuring the connection 164 to operate at a second, lower data rate $R_2(x)$, such as at 1 Gbps for example. In this regard, energy consumption associated with data delivery via the connection 164 may be represented by the hashed area 192b. As demonstrated by planes 190a and 190b, reconfiguring a link, such as connection 164, to reduce it by a certain factor to operate at lower data rate, may result in reducing energy consumption associated with use and/or operation of the link by a second, different factor which may be greater than the link data rate reduction factor. For example, reducing the data rate of connection 164 by half (½), from 2 Gbps to 1 Gbps, as shown in planes 190a and 190b, may result in reducing the associated energy consumption by a factor that is greater than half. In this regard, the shaded area 192c may represent additional energy consumption saving beyond halving the energy consumption associated with 2 Gbps data rate, as demonstrated by region 192*a* of plane 190*a*.

The greater energy consumption reduction savings when reducing link data rates may be attributed to various reasons. Increasing data rates may entail non-linear energy consumption increases, such that in exponential based manner for example. This may result from, for example, added complexity and/or operations needed to compress and/or communication the additional data using the same physical medium. For example, assuming that link configured as a 1 Gbps Ethernet link has a power consumption rate of ½ Watt, reconfiguring it as a 10 Gbps Ethernet link result in a power consumption rate of 10 Watts. Accordingly, reducing data rates may results in greater energy consumption reductions. Furthermore, using reduced data rates may enable achieving additional energy consumption savings resulting from requiring less processing and/or storage in the delivery path from the original source all the way down to the end recipient (e.g. broadband gateway 102).

Figure 2:
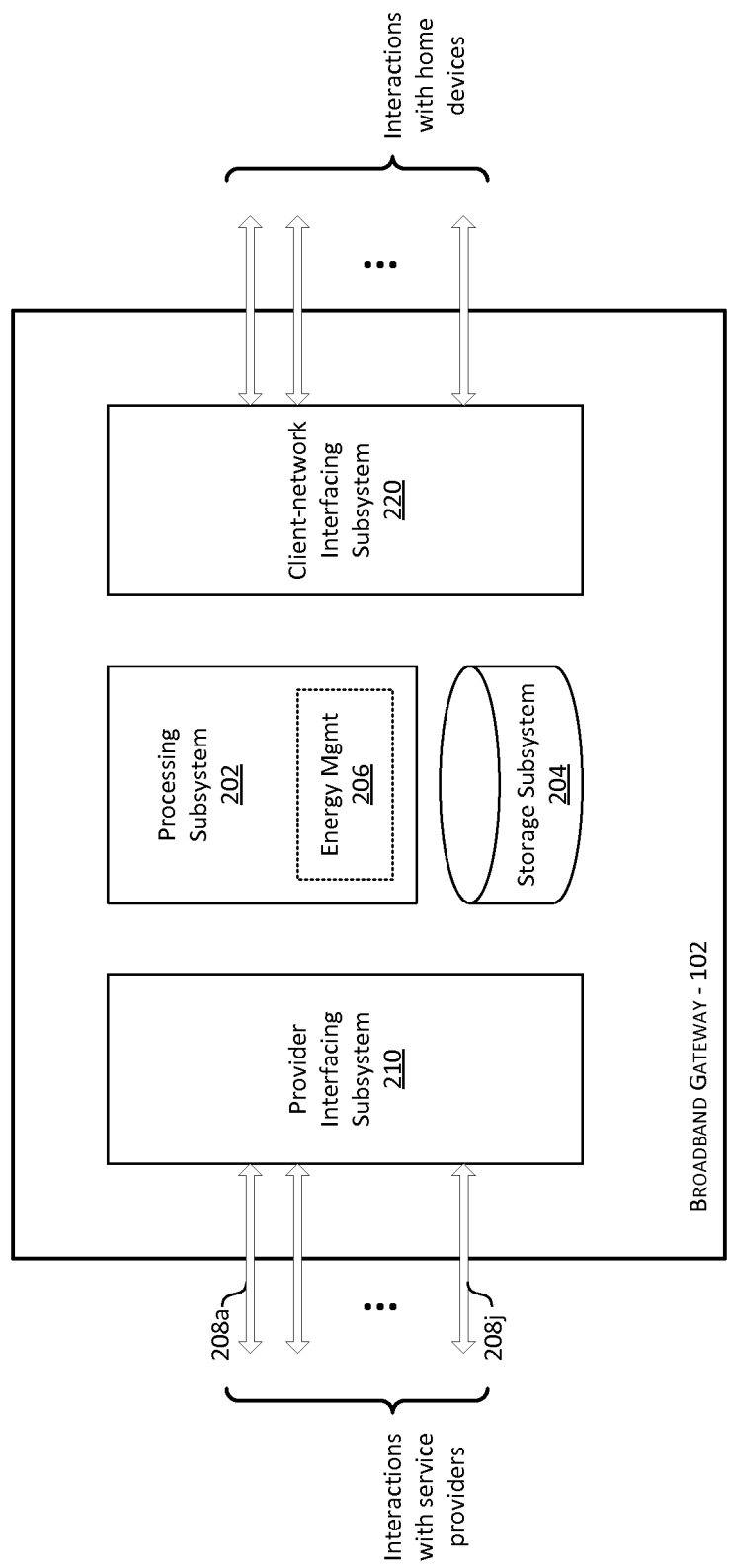
FIG. 2 is a block diagram illustrating an exemplary broadband gateway, in accordance with an embodiment of the invention.

FIG. 2 is a block diagram illustrating an exemplary broadband gateway, in accordance with an embodiment of the invention. Referring to FIG. 2, there is shown a broadband gateway 200 that may be substantially similar to the broadband gateway 102 described above with respect to FIGS. 1A and 1B.

The broadband gateway 200 may comprise suitable logic, circuitry, code, and/or interfaces that may be operable to provide connectivity between one or more external networks, such as the distribution networks 110 shown in FIG. 1A, for example, and one or more devices in a home network, such as the home devices 104*a*-104*j* in the home network 100*a* shown in FIG. 1A. In this regard, the broadband gateway 200 may operate as an interface device that allows one or more service providers 120, content providers 130, and/or emergency service providers 140, to interact with various devices in a home network serviced by the broadband gateway 200, and/or among the home devices themselves within the serviced home network.

The broadband gateway 200 may interact with serviced devices in a home network, such as the home network 100*a*, via wired and/or wireless communication links, to support communicating between the broadband gateway 200 and the home devices, and/or among the home devices via the broadband gateway 200. In this regard, the broadband gateway 200 may comprise suitable hardware and/or software to provide some or all of the functions and/or operations of one or more of a modem, a router, and a switch. The modem functions and/or operations may be those of a digital subscribed line (DSL) modem, a cable modem, or a wireless cable modem, for example. The router functions and/or operations may be those of a wireless router, for example. The switch functions and/or operations may be those of a network switch, or a local area network (LAN) switch, for example. In some instances, the broadband gateway 200 may communicate with the various devices in the home via more than one home network.

The broadband gateway 200 may comprise a plurality of modules, each of which may comprise hardware, software, or a combination thereof that may be utilized to perform various operations associated with the broadband gateway 200. For example, in an embodiment of the invention, shown in FIG. 2, the broadband gateway 200 may comprise a processing subsystem 202, a storage subsystem 204, a provider interfacing subsystem 210, and a client-network interfacing subsystem 220. In some instances, the broadband gateway 200 may be such that the various modules listed above may be distributed over multiple devices. Moreover, the modules listed above are provided by way of illustration and not of limitation. Other configurations and/or architectures of the broadband gateway 200 may be implemented. For example, the broadband gateway 200 may be a virtual gateway setup in a network by utilizing virtual machines (VMs) and/or next-generation (NG) data centers.

The processing subsystem 202 may comprise suitable logic, circuitry, interfaces, and/or code that may be operable to process data received from the service and/or content providers and/or data received from one or more devices in the home network 100*a*. In this regard, the processing subsystem 202 may comprise one or more portions that are suitable to handle certain types of data such as video data and/or audio data, for example. The processing subsystem 202 may also be operable to control and/or manage operations of the broadband gateway 200, and/or performing tasks and/or applications therein. For example, the processing subsystem 202 may enable execution of applications, programs and/or code, which may be stored in the storage subsystem 204 for example. In this regard, the processing subsystem 202 may be operable to configure and/or control operations of various components and/or subsystems of the broadband gateway 200, and/or other devices managed by and/or connected to broadband gateway 200, by utilizing, for example, one or more control signals. The processing subsystem 202 may also control data transfers within the broadband gateway 200, in the course of performing various applications and/or tasks for example. The processing subsystem 202 may comprise, for example, a plurality of processors, which may be general and/or specialized processors (e.g. CPU, video processors, and/or audio processors). While the processing subsystem 202 is shown herein as a single block, the invention needs not be so limited. Accordingly, in instances where the broadband gateway 200 is implemented a distributed platform, some of the operations and/or functions described herein with regard to the processing subsystem 202 may be performed by different components that may be located in different devices. In an exemplary aspect of the invention, the processing subsystem 202 may comprise an energy management block 206. In this regard, the energy management block 206 may comprise suitable logic, circuitry, interfaces, and/or code that may be operable to perform, control, and/or manage energy related services provided by the broadband gateway 200, substantially as described with regard to FIGS. 1A and 1B. In this regard, the energy management block 206 may be operable to provide energy efficient management of services provided and/or delivered to a home network serviced by the broadband gateway 200. This may comprise configuring, controlling, and/or managing external connections and/or interactions between the broadband gateway 200 and service or content providers accessed and/or utilized for providing the managed services.

The storage subsystem 204 may comprise suitable logic, circuitry, interfaces, and/or code that may be operable to store data utilized in the operations of the broadband gateway 200. In this regard, the storage subsystem 204 may comprise one or more memory devices that may enable permanent and/or non-permanent storage, buffering, and/or fetching of data, code and/or other information which may be used, consumed, and/or handled in the broadband gateway 200. For example, the storage subsystem 204 may be utilized to store configuration data, parameters, device information, tracking and/or monitoring information, security information, and intermediate processing data, for example. The storage subsystem 204 may comprise storage media integrated in the broadband gateway 200 and/or one or more removable storage devices. The storage subsystem 204 may comprise different memory technologies, including, for example, read-only memory (ROM), random access memory (RAM), and/or Flash memory. In an exemplary aspect of the invention, the storage subsystem 204 may be utilized to store energy-related data and/or code, which may be utilized in conjunction with energy related services provided by the broadband gateway 200, substantially as described with regard to FIGS. 1A and 1B.

The provider interfacing subsystem 210 may comprise suitable logic, circuitry, interfaces, and/or code that may be operable to communicate data via one or more physical layer connections 208a-208j, to one or more corresponding network access service providers via the distribution networks 110 for example. The provider interfacing subsystem 210 may be operable to support multiple communication protocols, standards, and/or data transport technologies. In this regard, each of the physical layer connections 208a-208j may connect the gateway 200 to different network access service provider, and may comprise a wired, optical, or wireless connection. Each of the physical layer connections 208a-208j may utilize different physical media and/or different physical layer protocols. For example, the connection 208a may comprise a DSL over twisted-pair connection whereas and the connection 208j may comprise a CATV over coaxial cable connection. Accordingly, the provider interfacing subsystem 210 may enable accessing and/or communicating with one or more service providers 120 and/or content providers 120, via the distribution networks 110. The provider interfacing subsystem 210 may also be utilized to communicate data to and/or from third parties. In this regard, the provider interfacing subsystem 210 may enable gateway-to-gateway communication and/or interactions between the broadband gateway 200 and communication devices located outside the home network 100a, directly and/or indirectly through distribution networks corresponding to one or more service providers. The provider interfacing subsystem 210 may enable concurrently communicating with multiple and/or different service/content providers and/or devices. In an exemplary aspect of the invention, one or more of the connections 208a-208j may be configured, controlled, and/or managed based on energy efficient service management performed by the broadband gateway 200, substantially as described with regard to FIGS. 1A and 1B.

The client-network interfacing subsystem 220 may comprise suitable logic, circuitry, interfaces, and/or code that may be operable to send data to one or more devices in the home network serviced and/or managed by the broadband gateway, such as the home network 100a. The client-network interfacing subsystem 220 may also be operable to receive data from one or more devices in the home network 100a. The client-network interfacing subsystem 220 may be operable to support multiple communication protocols, standards, and/or data transport technologies. For example, the client-network interfacing subsystem 220 may support the links 106a-106j.

In operation, the broadband gateway 200 may be utilized as an interface device that may interact with a plurality of devices in a home network, such as such as the devices 104a-104j in the home network 100a, and/or may provide connectivity between the devices in the home network and service and/or content providers. The broadband gateway 200 may also interact with a plurality of home devices in a home network, such as the devices 104a-104j in the home network 100a, using the client-network interfacing subsystem 220. In this regard, the client-network interfacing subsystem 220 may support use of one or more of the links 106a-106j. Furthermore, the broadband gateway 200 may interact with one or more service providers 120 via the provider interfacing subsystem 210, to enable exchanging messages and/or content for example, via one or more of the distribution networks 110. Accordingly, the broadband gateway 200 may enable and/or facilitate obtaining content (e.g. multimedia content) from one or more content providers 130, wherein the content may be delivered through one or more services providers 120. The broadband gateway 200 may distribute the received content to one or more of the plurality of home devices 104a-104j, for content consumption, and/or may perform, directly via the processing subsystem 202 and/or indirectly utilizing other devices communicatively coupled to the broadband gateway 200, any processing and/or procedures (e.g. decryption and/or account validation) that may be necessary to ensure that the content may be consumed by the home device(s).

The broadband gateway 200 may be operable to run or execute an agent to extract content, rating, copyright, language, privacy rules, and automatically add user generated content, for example. Such agent may be run or executed in connection with the processing subsystem 202 of the broadband gateway 200, for example. Furthermore, the broadband gateway 200 may be operable to combine and/or blend multiple contents for use as single content in the home network. Such combination may be performed in one or more of the modules of the broadband gateway 200. For example, the broadband gateway 200 may blend different video and audio contents for an event by accessing one or more service/content providers and providing automatic and/or manual content synchronization.

The broadband gateway 200 may also provide various services and/or tasks beyond, in addition to, and/or in conjunction with content delivery to home devices. For example, the broadband gateway 200 may perform content search, transport discovery, ranking, and/or sorting. In this regard, some operations may be performed based on content quality, price, quality-of-service (QoS), and network protocols supported by the devices in the home network, such as service level agreements (SLAs), for example.

The broadband gateway 200 may provide user interface services in the home network. In this regard, the broadband gateway 200 may be operable to support user interfaces, and/or to generate and/or store data corresponding thereto, which may be utilized to enable interactions between the broadband gateway 200 and users, such as in the home network 100a for example. Exemplary user interfaces may comprise graphic user interfaces (GUIs), which may enable visually displaying and/or providing interaction with users, to provide visual interaction with customized content for example. Information inputted and/or outputted using the user interfaces may be stored in the broadband gateway 200, via the storage subsystem 204 for example. The user interfaces may enable configuring the broadband gateway 200, and/or any applications and/or services provided thereby, and/or may also be utilized to configure and/or adjust other devices in the home network 100a. GUIs, and like interfaces, may be displayed using one or more devices coupled to the broadband gateway 200. For example, interfaces generated and/or used by the broadband gateway 200 may be displayed using the television 104a.

The broadband gateway 200 may also be utilized to create, maintain, and/or update a plurality of profiles corresponding to users, devices, and/or services available in the home network 100a. Furthermore, user interfaces supported and/or used by the broadband gateway 200 may be utilized to enable displaying and/or modifying user, device, and/or service profiles. Data corresponding to these profiles may be stored in the storage subsystem 204 of the broadband gateway 200. For example, device-profiles may be utilized to store information associated with particular devices that may be coupled to and/or serviced by the broadband gateway 200. In this regard, device-profiles may be utilized for storage of information pertaining to device capabilities, limitations, requirements, and/or configuration parameters therefor. User-profiles may be utilize to store information associated with particular users, such as setting preferences for various devices and/or services that may be utilized by a particular user in conjunction with the broadband gateway 200. The broadband gateway 200 may utilize user and/or home device profile information to, for example, select layered video service(s) and/or transmission. In some instances, the programming and/or enhanced video layers received by the broadband gateway 200 may be aggregated midstream by one or more network or routing nodes.

The gateway functionality associated with a user, such as security features, preferences, applications, electronic programming guides (EPGs), and user profile, for example, may be ported from the broadband gateway 200 to one or more other broadband gateways 200 in other locations. In some instances, a visitor may be allowed access to their content outside their service/content provider service area by, for example, classifying the access level for different users and/ or by providing limited access to content. Moreover, the broadband gateway 200 may allow multiple user interface software structures by, for example, standardizing an interface to service/content providers and devices in the home network.

In various embodiments of the invention, the broadband gateway 200 may provide, via the energy management block 206 for example, energy related services to a network serviced by the broadband gateway 200, such as the home network 150 for example. In this regard, the energy management block 206 may be utilized to provide energy efficient service management, substantially as described with regard to FIGS. 1A and/or 1B. The energy efficient service management may comprise configuring, managing, and/or controlling interactions with, and/or connectivity to service or content providers, to enable reducing and/or optimizing energy consumption on the network side. Data and/or code utilized in these operations may be stored in, and/or retrieved from the storage subsystem 204. Furthermore, the broadband gateway 200 may interact with the managed devices via the client-network interfacing subsystem 220 when providing the energy efficient service management.

For example, the broadband gateway 200 may be operable to configure one or more services that may be requested within the home network 150. In this regard, the service configuration may comprise performing and/or utilizing physical (PHY) layer selection, bitrate selection, and/or service performance configuration and/or management, substantially as described with regard to FIG. 1B. The energy efficient management may be performed based on energy-related information pertaining to requested services and/or devices that may utilized in conjunction with the requested services. The energy related information may comprise energy requirements and/or limitations, and/or available energy-saving options. In this regard, the energy management block 206 may determine when and/or if the requested services may be configured and/or adjusted to enable network-side energy consumption reduction and/or optimization. The energy management block 206 may communicate, via the provider interfacing subsystem 210, with service or content providers to negotiate for providing energy efficient modification and/or configuration of requested services, which may be provided or agreed to in exchange for energy-saving credits for example.

In one exemplary embodiment of the invention, the broadband gateway 200 may be operable to create and/or maintain an energy related database, which may be utilized in conjunction with energy management services provided by the broadband gateway 200. In this regard, the energy related database may be utilized to store energy related information corresponding to services performed and/or devices serviced by the broadband gateway 200, and/or to operations performed thereby, substantially as described with regard to, for example, FIGS. 1A and 1B. The energy related database, or portions thereof, may be stored into, and/or retrieved from the storage subsystem 204, for example.

The broadband gateway 200 may continually or periodically monitor and/or track, via the energy management block 206 for example, operations and/or conditions of serviced devices, access or distribution networks, and/or service performed, to determine and/or update energy related information corresponding to services and/or devices, which may be utilized in conjunction with energy management services provided by the broadband gateway 200. In this regard, the broadband gateway 200 may create and/or update corresponding service and/or device profiles in the energy related database. Furthermore, actual power consumption may be tracked and/or aggregated, to create actual usage data for each of the services or devices. The actual usage data may be made available, and/or may be reported within the serviced network, and/or external to the serviced network, such as to energy providers, using the provider interfacing subsystem 210 for example.

In an exemplary embodiment of the invention, a dedicated protocol and/or interface may be utilized during energy optimization related operations in broadband gateways. In this regard, the energy related protocol may be utilized within the home network, in conjunction with communications between the broadband gateway 200 and home devices. For example, dedicated energy messages, or fields within existing messages, may be utilized to enable the broadband gateway 200, for example, to request and/or obtain energy-related information, and/or to specify and/or provide energy related configuration or operation parameters and/or criteria. In this regard, the client-network interfacing subsystem 220 may be configured to support and/or incorporate any such energy protocol.

The energy related protocol may also be utilized external to the home network. In this regard, the energy related protocol may be utilized to enable communication of energy related information between the broadband gateway 200 and entities external to the home network managed by the broadband gateway 200, to enable energy consumption reduction and/or optimization. The external entities may correspond to various entities within delivery infrastructure utilized in delivery content to the broadband gateway 200 for example. In this regard, the delivery infrastructure may comprise service providers, content providers, and/or any additional support devices and/ or systems. In this regard, the provider interfacing subsystem 210 may be configured to support and/or incorporate any such energy protocol. The energy protocol may also be utilized to provide energy related communication among the external entities. For example, the energy related protocol may define dedicated energy messages, and/or energy related fields that may be incorporated into existing protocols or messages thereof, to enable, for example, requesting and/or obtaining energy-related information, and/or for facilitating energy related configuration or operation modifications.

FIG. 3A is a flow chart that illustrates exemplary steps for utilizing a broadband gateway to generate and/or update device or service profiles for use in conjunction with energy efficient based service management, in accordance with an embodiment of the invention. Referring to FIG. 3A, there is shown a flow chart 300 comprising a plurality of exemplary steps that may be performed by a broadband gateway to enable generating and/or updating efficient energy related device or service profiles.

In step 302, a broadband gateway may create service and/or device energy-related profiles. For example, the broadband gateway 200 may create a device profile, as an entry in the energy management database for example, for each device in a network serviced by the broadband gateway 200. Similarly, the broadband gateway 200 may create a service profile, as an entry in the energy management database for example, for each service provided to via the broadband gateway 200, specifically for services that require use and/or access of external networks, during which energy may be consumed. In step 304, the broadband gateway 200 may populate service and/or device profiles with energy related data. In this regard, the service and/or device profiles may be populated based on preconfigured, predetermined, dynamically determined and/or default parameters. The service profiles may be utilized to store service-specific energy related parameters and/or information, which may correspond to various energy-cost combinations for providing the associated service, based on use of different bitrates, PHY layers, and/or service agreements for example. The device profiles may be utilized to store device-specific energy related parameters and/or information, such as energy requirements and/or limitations, energy-related configuration data, and/or energy-saving options. In step 306, the broadband gateway 200 may update service and/or device profiles, based on autonomous monitoring and/or tracking by the broadband gateway 200, and/or based on information provided to broadband gateway 200.

FIG. 3B is a flow chart that illustrates exemplary steps for utilizing the broadband gateway to provide energy efficient based management of service delivery to a home network, in accordance with an embodiment of the invention. Referring to FIG. 3B, there is shown a flow chart 330 comprising a plurality of exemplary steps that may be performed by a broadband gateway to provide energy efficient based management of service delivery to a home network, such as the home network 150.

In step 332, a broadband gateway may receive a request to provide a service to a home network serviced by the broadband gateway. For example, the broadband gateway 102 may receive a request from a user and/or a home device in the home network 150, to provide a service by service provider 170a. In step 334, the broadband gateway 102 may negotiate with service providers to facilitate performing the requested service, based on existing service (and/or device) profiles and/or default energy efficient data, if available. In this regard, the negotiation may comprise determining various energy-based combinations for providing the requested service. For example, the broadband gateway 102 may negotiate with the service provider 170a to determine whether a requested service may be performed in various ways, with corresponding combinations of energy costs and/or energy-saving credits. In step 336, the broadband gateway may configure performance and/or delivery of the service. This may comprise, for example, configuring aspects relating to connectivity and/or interactions between the broadband gateway and service providers. For example, the broadband gateway 102 may configure such aspects as bitrate selection, physical (PHY) layer selection, and/or service agreement related parameters. In step 338, the broadband gateway may continually monitor and/or adjust configuration of service, and/or connections, based on energy related information.

Figure 3C:
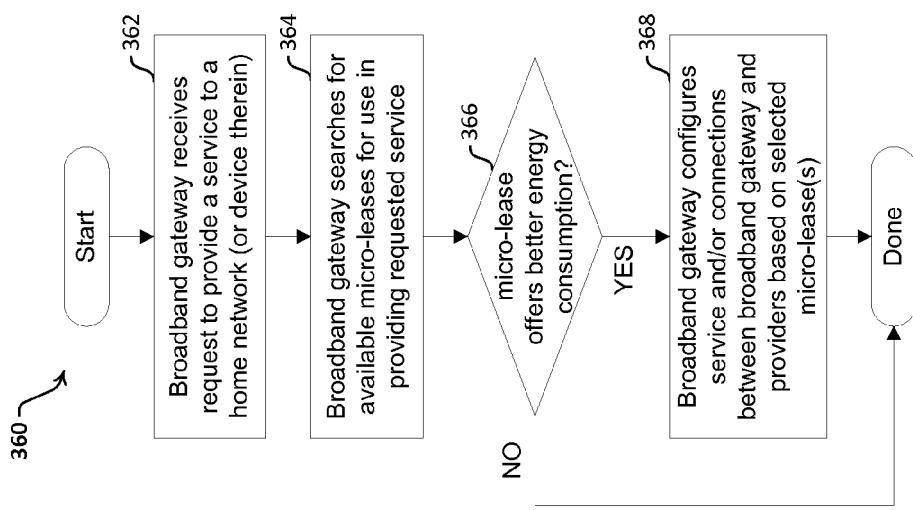
FIG. 3C is a flow chart that illustrates exemplary steps for utilizing micro-leases to provide energy efficient delivery of content and/or service to a home network via a broadband gateway, in accordance with an embodiment of the invention.

FIG. 3C is a flow chart that illustrates exemplary steps for utilizing micro-leases to provide energy efficient delivery of content and/or service to a home network via a broadband gateway, in accordance with an embodiment of the invention. Referring to FIG. 3C, there is shown a flow chart 360 comprising a plurality of exemplary steps that may be performed by a broadband gateway to configure service delivery to a home network, such as the home network 150, using available micro-leases.

In step 362, a broadband gateway may receive a request to provide a service to a home network serviced by the broadband gateway. For example, the broadband gateway 102 may receive a request from a user and/or a home device in the home network 150, to provide a service by service provider 170a. In this regard, the service may comprise obtaining certain content. In step 364, the broadband gateway 102 may search for available micro-leases for use in providing requested service. In this regard, micro-leases may comprise dynamically established service contracts, for short durations, such as on hourly, daily, or weekly basis, with negotiable performance requirements, such as latency and/or quality of service, which are only applicable to the duration of the particular micro-lease (contract). Accordingly, micro-leases may be an alternative to, and/or may be used in lieu of long running service level agreements (SLAs), which are typically configured and/or structured in fixed manner based on, and/or guaranteeing maximum possible performance requirements. In step 366, the broadband gateway may determine whether providing the requested service via any discovered micro-lease offers energy consumption reduction and/or optimization, compared to using existing SLAs for example. In this regard, the broadband gateway 102 may evaluate energy consumption criteria, comprising requirement and/or limitations for example, associated with providing the requested service based on any discovered micro-leases, and/or any existing SLAs. In instances where the broadband gateway 102 may determine that providing the requested service via a discovered micro-lease may offer energy consumption reduction and/or optimization, the exemplary steps may proceed to step 368. In step 368, the broadband gateway may configure performance and/or delivery of the requested service based on the selected micro-lease.

Figure 4:
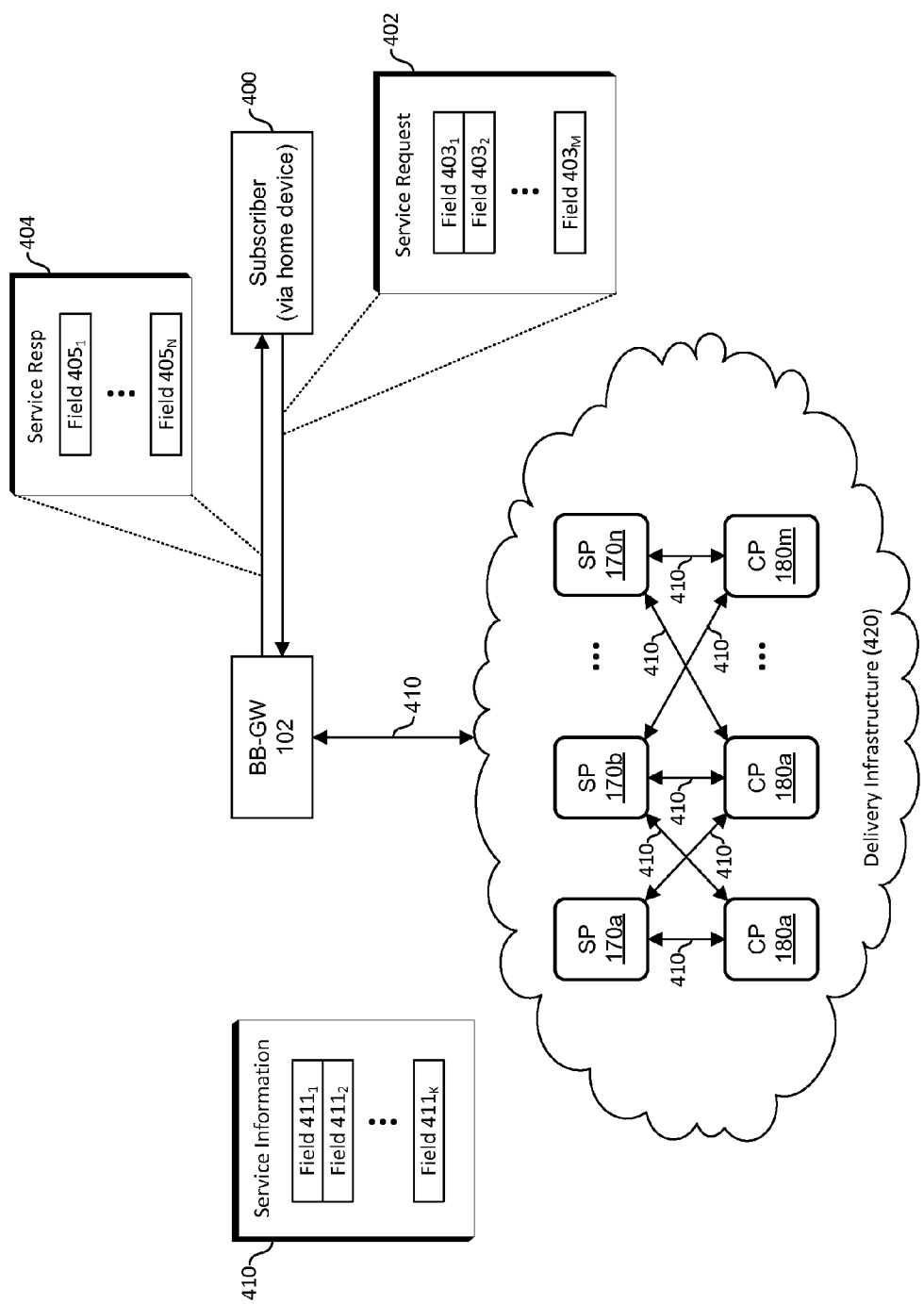
FIG. 4 is a block diagram that illustrates exemplary energy based messaging protocol for use in providing energy efficient service delivery to a home network, in accordance with an embodiment of the invention.

FIG. 4 is a block diagram that illustrates exemplary energy based messaging protocol for use in providing energy efficient service delivery to a home network, in accordance with an embodiment of the invention. Referring to FIG. 4, there is shown a delivery infrastructure 420 that may be utilized in delivery services to a subscriber 400 via the broadband gateway 102. In this regard, services provided by the delivery infrastructure 400 may comprise delivering content requested by subscriber 400.

The delivery infrastructure 420 may comprise the plurality of content providers 180a-180m, the plurality of service providers 170a-170n, and/or any additional support entities, such as devices, networks, and/or systems, which may be utilized to facilitate and/or support service delivery via the broadband gateway 102.

In an exemplary embodiment of the invention, energy related information may be exchanged and/or utilized when providing services via the delivery infrastructure 400. In this regard, energy related information may be exchanged when requesting, offering, and/or configuring services delivered by the delivery infrastructure 400 to the broadband gateway 102. Exchange of energy information may be via dedicated energy packets, and/or by incorporating energy related into existing protocols or messages thereof. The invention is not limited to any particular type of packets. In this regard, energy related information may be exchanged via L2, L3, and/or L4 based packets for example. Furthermore, exchange of energy related information is not limited to particular medium. For example, energy related information may be exchange over Ethernet and/or non-Ethernet connections, such as DOCSIS for example.

The exchange of energy related information may be incorporated into, and/or performed dynamically as part of service providing procedure. For example, subscriber 400 may communicate a service request 402. The service request 402 may comprise a plurality of fields $403_1$-$403_M$. In this regard, fields $403_1$-$403_M$ may be configured and/or set to indicate various desired aspects of the requested service. For example, when the requested services comprise delivery of content, the fields $403_1$-$403_M$ may specify such parameters and/or criteria as display options, resolution preferences, latency preferences (e.g., real-time vs. download), quality of service, etc. In an exemplary aspect of the invention, one or more of the fields $403_1$-$403_M$ may also be utilized to provide subscriber energy consumption preferences.

The broadband gateway 102 may respond with one or more service response messages 404. The service response 404 may comprise a plurality of fields $405_1$-$405_N$. In this regard, fields $405_1$-$405_N$ may specify various aspects of offered services. For example, when requested services comprises delivery of content, the fields $405_1$-$405_N$ may specify such parameters and/or criteria as available display options, available resolution, available latency (e.g., real-time vs. download), available quality of service, etc. In an exemplary aspect of the invention, one or more of the fields $405_1$-$405_N$ may also be utilized to provide additional information, such as cost related information and/or energy consumption related information. In this regard, the energy consumption options may comprise energy saving options and/or corresponding credits and/or rewards that may be offered in exchange for selection thereof.

To generate service responses 404, the broadband gateway 102 may communicate with the delivery infrastructure 420, and/or entities therein such as content providers 180a-180m and/or service providers 170a-170n, to determine service options availability. Furthermore, entities within the delivery infrastructure 420 may also exchange information when determining availability of requested services, and/or parameters thereof. For example, the broadband gateway 102, the content providers 180a-180m and/or service providers 170a-170n may exchange service information packets 410. In this regard, the service information packet 410 may comprise a plurality of fields $411_1$-$411_K$. In this regard, fields $411_1$-$411_K$ may specify various aspects of offered services. For example, the fields $411_1$-$411_K$ may be utilized to provide information pertaining to application requirements, which may be relevant to requested and/or offered service options. Exemplary application requirements may comprise, for example, latency, bandwidth, and/or link reservation information (e.g. time). In an exemplary aspect of the invention, one or more of the fields $411_1$-$411_K$ may also be utilized to provide additional information, such as associated cost information (preferences and/or costs) and/or associated energy consumption related information (preferences and/or costs). Accordingly, the service information packets 410 may be exchanged between the broadband gateway 102 and the delivery infrastructure 420, and/or within the delivery infrastructure 420 to enable specifying energy consumption preferences and/or discovering energy consumption optimization or reduction options when searching for services options in response to service requests, and/or configuring service provided based thereon. Furthermore, the service information packets 410 may be continually exchanged, to enable, for example, discovering and/or determining when conditions change in a manner that affect energy consumption during service delivery via the broadband gateway 102.

Various embodiments of the invention may comprise a method and system for energy efficient based service optimization by a broadband gateway. The broadband gateway 200 may provide, via the energy management block 206 for example, energy efficient management of services provided and/or delivered to home networks, such the home network 150. The energy management service may enable reducing and/or optimizing energy consumption external to the home networks, such as when using the distribution networks 110 to perform and/or deliver the corresponding managed services. The energy efficient service management may comprise determining, via the energy management block 206, energy-related costs associated with providing a service to the home network 150, wherein the energy-related costs may be based on, for example, use of at least one of the connections 162, 164, and 166. The service may be configured by the energy management block 206 based on determined energy-related costs associated with that service. The service may comprise obtaining and/or delivering content for consumption by the one or more of the plurality of devices in the network.

The broadband gateway 200 may negotiate with the service providers during the configuration of the services. The negotiations may comprise requesting energy-saving credits in exchange for performing the service configuration in a manner enabling energy consumption optimization and/or reduction. The service configuration may comprise controlling and/or adjusting bitrate selection, physical (PHY) layer selection, and/or service level agreement (SLA) parameters. The broadband gateway 200 may determine and/or acquire energy-related information for use in providing the energy efficient service management. The energy-related information may correspond to the managed services, and/or to home devices, such as the home device 152a, 152b, and/or 152c, which may be utilized in conjunction with the managed services. The energy-related information may comprise energy requirements, energy limitations, device use pattern, time of use related data, and/or energy-saving options.

The broadband gateway 200 may track actual energy usage for each of the one or more serviced devices, and the broadband gateway 200 may update and/or modify the stored energy-related information based on that tracking. The stored energy-related information may comprise service and/or device profiles corresponding to each of the managed services and/or devices associated with the managed services. The profiles may be configurable, wherein the profile configuration may comprise initializing and/or modifying energy-related information corresponding to associated services or devices. The broadband gateway 200 may display activity associated with the energy management service via a user interface. This may comprise displaying energy related activities and/or data associated with each of the managed services or devices.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for energy efficient based service optimization by a broadband gateway.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
    in a broadband gateway communicatively coupled to a plurality of devices, wherein said broadband gateway is configured to handle at least one physical layer connection to at least one network access service provider:
    providing energy management of services to one or more of said plurality of devices, wherein said providing energy management comprises:
    determining energy-related costs associated with utilizing said at least one physical layer connection at different data rates when providing a service to said one or more of said plurality of devices;
    negotiating with said at least one network access service provider by determining different service configurations of said at least one physical layer connection, said different service configurations comprising micro-lease configurations to be utilized in lieu of or in conjunction with one or more service level agreements (SLAs); and
    provisioning said service to said one or more of said plurality of devices based on said energy-related costs and a service profile of said service, using one of said different service configurations.

2. The method according to claim 1, wherein said service comprises at least one of obtaining or delivering content for consumption by said one or more of said plurality of devices.

3. The method according to claim 1, wherein said micro-lease configurations comprises configurations of short-term service contracts or dynamically-negotiated service contracts.

4. The method according to claim 3, wherein said negotiating comprises requesting credits for modifying energy consumption based on use of said at least one physical layer connection.

5. The method according to claim 1, comprising controlling at least one of bitrate selection, physical (PHY) layer selection, or service level parameters during said provisioning of said service.

6. The method according to claim 1, comprising at least one of negotiating or configuring one or more micro-leases during said provisioning said service to support at least a portion of said service.

7. The method according to claim 1, comprising at least one of determining or acquiring energy-related information for use in providing said energy management.

8. The method according to claim 7, wherein said energy-related information comprises at least one of energy requirements, energy limitations, device use patterns, or time of use related data.

9. The method according to claim 1, comprising communicating using a dedicated energy messaging protocol when providing said energy management.

10. A system comprising:
    one or more circuits, one or more processors, or any combination thereof for use in a broadband gateway communicatively coupled to a plurality of devices, wherein said broadband gateway is configured to handle at least one physical layer connection to at least one network access service provider, said one or more circuits, one or more processors, or any combination thereof being configured to:
    determine energy-related costs associated with utilizing said at least one physical layer connection at different data rates when providing a service to said one or more of said plurality of devices;
    negotiate with said at least one network access service provider by determining different service configurations of said at least one physical layer connection, said different service configurations comprising micro-lease configurations to be utilized in lieu of or in conjunction with one or more service level agreements (SLAs); and
    provision said service to said one or more of said plurality of devices based on said energy-related costs and a service profile of said service, using one of said different service configurations.

11. The system according to claim 10, wherein said service comprises at least one of obtaining or delivering content for consumption by said one or more of said plurality of devices.

12. The system according to claim 10, wherein said micro-lease configurations comprises configurations of short-term service contracts or dynamically-negotiated service contracts.

13. The system according to claim 12, wherein said one or more circuits, one or more processors, or any combination thereof is configured to request credits for modified energy consumption based on use of said at least one physical layer connection.

14. The system according to claim 10, wherein said one or more circuits, one or more processors, or any combination thereof is configured to control at least one of bitrate selection, physical (PHY) layer selection, or service level parameters.

15. The system according to claim 10, wherein said one or more circuits, one or more processors, or any combination thereof is configured to at least one of negotiate or configure one or more micro-leases to support at least a portion of said service.

16. The system according to claim 10, wherein said one or more circuits, one or more processors, or any combination thereof is configured to at least one of determine or acquire energy-related information to provide said energy management.

17. The system according to claim 16, wherein said energy-related information comprises at least one of energy requirements, energy limitations, device use patterns, or time of use related data.

18. The system according to claim 10, wherein said one or more circuits, one or more processors, or any combination thereof is configured to communicate using a dedicated energy messaging protocol to provide said energy management.

19. A method, comprising:
   in a broadband gateway configured to handle at least one physical layer connection to at least one network access service provider:
   determining energy-related costs associated with utilizing said at least one physical layer connection at different data rates when providing a service to at least one device coupled to said broadband gateway;
   negotiating with said at least one network access service provider by determining different service configurations of said at least one physical layer connection, said different service configurations comprising micro-lease configurations to be utilized in lieu of or in conjunction with one or more service level agreements (SLAs); and
   configuring, with said broadband gateway, said at least one physical layer connection to operate in one of said different service configurations at a data rate to reduce energy consumption associated with utilizing said at least one physical layer connection based on said energy-related costs and a service profile of said service.

20. The method according to claim 19, comprising:
   receiving, from said at least one device coupled to said broadband gateway, a request to provide a service; and
   in response to said request, negotiating a service level parameter with a service provider, to provide said service.

* * * * *